May 19, 1936. H. L. ADAMS 2,041,450
SAFETY FUEL TANK
Filed July 30, 1932 2 Sheets-Sheet 1
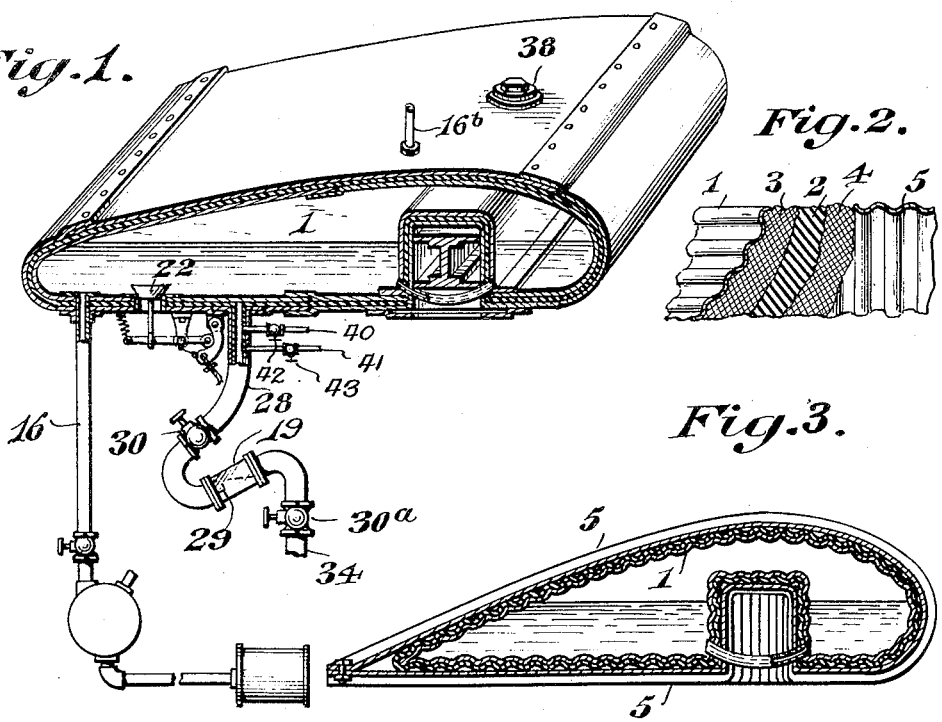
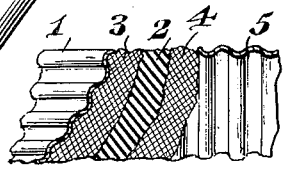
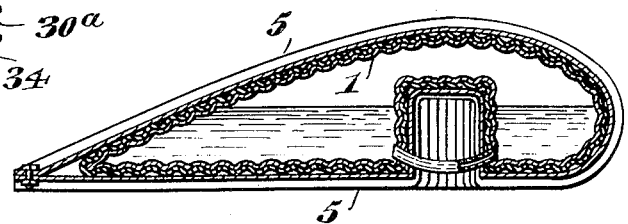
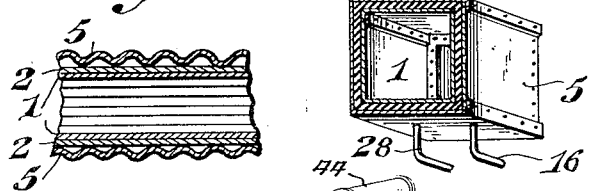
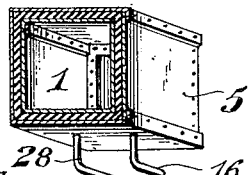
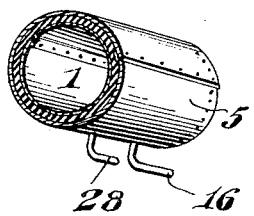
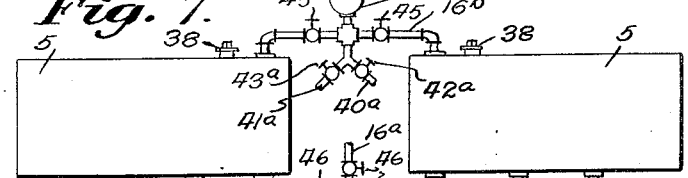
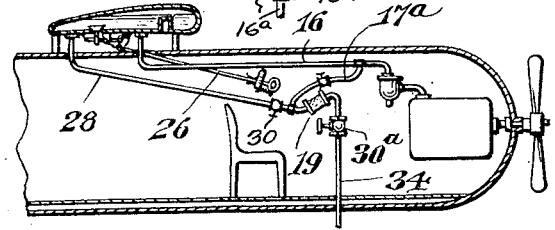
Inventor
H. L. Adams May 19, 1936.   H. L. ADAMS   2,041,450
SAFETY FUEL TANK
Filed July 30, 1932   2 Sheets-Sheet 2
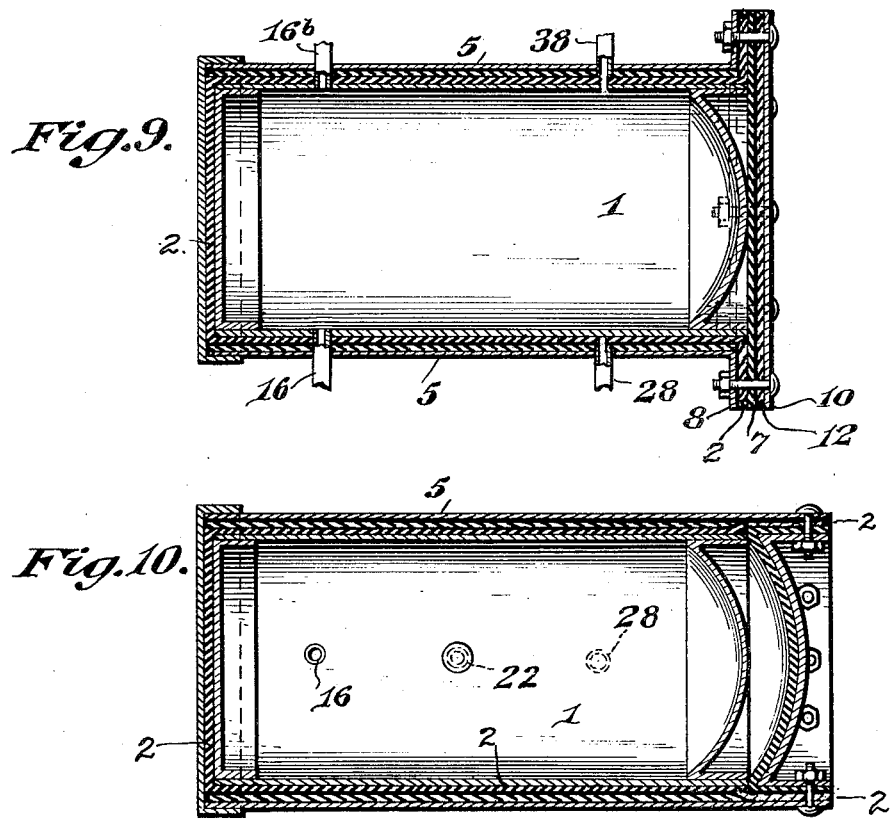
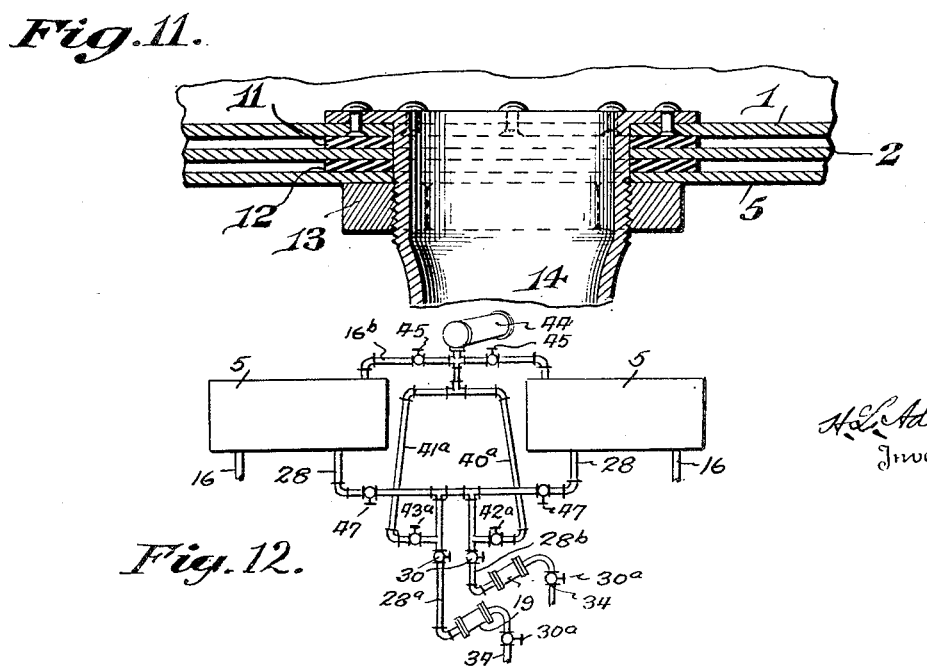

Patented May 19, 1936

2,041,450

UNITED STATES PATENT OFFICE 2,041,450

SAFETY FUEL TANK

Herbert Luther Adams, Washington, D. C.

Application July 30, 1932, Serial No. 627,090

7 Claims. (Cl. 137—77)

My invention primarily relates to that class of flying machines which are heavier than air but certain details may be used on any flying machine, aircraft, or other uses.

The primary object of the invention is to provide a safety fuel tank suitable for use on aircraft which is so designed and arranged that, in the event of a leak in the tank, the pilot of the aircraft will be warned thereof without delay.

A further object of the invention is to provide a tank of the character aforesaid, in which a pair of spaced, concentrically arranged containers have interposed therebetween in concentric relation thereto an elastic container capable of temporarily holding the fuel in the event of a leak in the inner container, and in which connections are provided with the spaces on either side of the elastic container to enable the pilot to make tests to determine whether the leak is confined to the inner container.

A further object of the invention is to provide a multiple container tank with connections as aforesaid by means of which the pilot may make tests to determine whether an opening through all of the containers, such as caused by a projectile, has been temporarily closed at the elastic container by the action of the fuel on the elastic material.

A further object of the invention is to provide a multiple container tank of the character aforesaid, in which a fabric lining is disposed on either side of the elastic container to protect the latter from any jagged edges that may form around the openings through the inner and outer containers.

A further object of the invention is to provide a multiple container tank of the character aforesaid in which the elastic container may be readily removed for replacement or repair.

A safety fuel tank in accordance with this invention is illustrated in the accompanying drawings, in which:

Figure 1 is a sectional perspective of a tank in accordance with this invention, showing the connections therewith for testing the same for leaks.

Figure 2 is a fragmentary elevation of a modified form of wall for the tank, partly broken away to show the construction of the wall.

Figure 3 is a vertical section through the tank shown in Figure 1.

Figure 4 is a fragmentary section through a tank showing another modified form of wall construction.

Figure 5 is a sectional perspective of a modified form of tank.

Figure 6 is a sectional perspective through another modified form of tank.

Figure 7 is a diagrammatic view showing a pair of tanks with means for the transfer of fuel from one tank to the other.

Figure 8 is a reduced fragmentary section of an aircraft equipped with a safety tank in accordance with this invention.

Figure 9 is a longitudinal section through a modified form of tank.

Figure 10 is a longitudinal section through another modified form of tank.

Figure 11 is an enlarged fragmentary section showing the means for connecting the fuel line with the tank.

Figure 12 is a diagrammatic view similar to Figure 7, showing a pair of tanks with means for testing the tanks selectively for leaks.

A safety fuel tank in accordance with this invention contemplates an inner container within which the fuel is contained, an elastic container loosely enclosing the inner container, and an outer container loosely enclosing the elastic container. Communicating with the spaces respectively inside and outside of the elastic container, as the result of the loose relative arrangement of the containers, are a pair of passageways each provided with a valve, and both leading to a tell tale device located in the cockpit of the aircraft. Also communicating with said passageways are a pair of pipes or conduits, each provided with a source of fluid pressure supply. By manipulation of the first mentioned set of valves, communication between the tell tale device and the spaces inside and outside of the elastic container may be selectively established or cut off as desired, and by manipulation of the next mentioned set of valves, communication between the source of fluid pressure supply and said spaces may be selectively established or cut off as desired. By this arrangement, the pilot may test either space desired for the presence of fuel therein by opening the valve between the space to be tested and the tell tale device, and closing the valve between such space and the fluid pressure supply, at the same time closing the other space to the tell tale device, and opening the same to the fluid pressure supply. This relative arrangement of the valves allows the pressure fluid to enter said other space where it is trapped, and by the exertion of its force on the elastic container will squeeze out any fuel that is contained in the space being tested.

Preferably the elastic container will be of such consistency as will deteriorate in the presence of gasoline sufficiently to close a small hole therein, after which the space surrounding the elastic container may be entirely emptied of gasoline by means of the fluid pressure system to protect the outer face of the elastic container from continued attack by the gasoline, which, if allowed to continue, ultimately would dissolve the elastic container. Also the tank preferably will be constructed in a manner to permit ready removal of the elastic container for inspection, and if necessary, repair or replacement. Subject to any or all of the above requirements, the tank, or a plurality of tanks, may be made in any shape desirable to fit the space available.

Referring to the drawings in detail the inner container 1 shall be made of very thin material found most desirable. It may or may not be corrugated but corrugated material is believed to be most desirable to reduce the weight and to give stiffness and rigidity or strength to the container 1. The joints in this container 1 may be electrically welded or riveted or any other method found desirable in their construction. Outside of the inner container 1 is a flexible casing 2 preferably of rubber, that is made air or gas tight but which is so designed that the inner container 1 may be removed from this rubber cover 2 for examination or repair if found desirable. This rubber cover 2 may be protected on both inside and outside with fabric 3 and 4 respectively to prevent the breaking metal containers 1 and 5 from cutting the rubber cover 2. The outside metal container 5 is preferably very thin to still further protect the rubber cover 2 from damage, and is preferably made of corrugated metal, the corrugations in the outer container 5 running in the opposite direction to the corrugations of the inner container 1 to aid in stiffening the whole tank if the same is found necessary or desirable.

Where the shape of the tank will permit, preferably the same will be constructed in some such manner as illustrated in Figures 9 and 10 to permit the ready removal of the elastic container 2 in order that the latter may be repaired or replaced. In the construction shown in Figure 9, the containers 1 and 5 are each formed with an open end, and at their open ends are provided respectively with flanges 7 and 8. The container 2 also is formed with an open end with the adjacent portion bent outwardly to extend between the flanges 7 and 8. A head 10 including elements corresponding to the containers 1, 2 and 5, is securely fastened to the flanges.

In Figure 11 is shown a desirable means for making the necessary connections with the tank. This means includes a thimble 14 having a flange secured to the container 1, and abutting the inner face thereof. A nut 13 is threaded on the thimble for abutment against the outer face of the container 5 to tighten the thimble. Suitable gaskets 11 and 12 preferably are disposed between the elastic container 2 and the inner and outer containers 1 and 5.

Connected with the outer container 5, and extending through the same, is a pipe or conduit 28 which is connected at its outer end with a tell tale device 19, which, as shown, is in the form of a glass cylinder. Also connected with the device 19, at the opposite end thereof from the pipe 28, is a pipe 34 which provides a discharge outlet for the device 19, and which is provided with a valve 30a. As shown in Figure 8, the device 19 is located adjacent the pilot's seat of the aircraft.

Loosely fitting within the pipe 28 is a tube 29 having one end opening into the device 19. The tube 29 extends entirely through the pipe 28, and also through the wall of the elastic container 2 whereby the tube itself establishes communication between the interior of the container 2 and device 19, and the space between the tube 29 and pipe 28 establishes communication between the device 19 and the interior of the outer container 5. These passages are controlled by a suitable valve or valves indicated conventionally at 30, which may be of any suitable construction for selectively opening and closing the passages between the device 19 and the interiors of the containers 2 and 5 respectively.

Communicating with the passages inside and outside respectively of the tube 29 are a pair of pipes 40 and 41 which are provided with valves 42 and 43, and are adapted for connection with a source of fluid pressure supply such as shown conventionally at 44 in Figures 7 and 12. The fluid pressure supply source 44 is connected with the interior of the inner container 1 by means of a pipe 16b in order that pressure may be applied to the contents of this container. When used in connection with a plurality of tanks as shown in Figures 7 and 12, a pipe 16b extends to each tank, and each of the pipes 16b is provided with a valve 45. By providing the tanks with valved connecting pipes as shown at 16a in Figure 7, the pressure supply source 44 may be utilized for transferring fuel from one tank to the other. By manipulation of the valves 45 in pipes 16b, and 46 in 16a, communication may be established between the pressure supply source 44 and any one of a number of tanks, and also between any two of a number of tanks in order that fuel may be transferred selectively from one tank to another.

Instead of the single tell tale device shown in Figures 1 and 8, a pair of them may be employed if desired, as shown in Figure 12. In this construction, the pipes 28 with the double passageways therein are in communication, and are each provided with a valve 47 in order that the passages leading from the several tanks may be opened or closed as desired. Connected with each of the pipes 28 are a pair of pipes 28a and 28b, each of which is provided with a valve 30 and is connected with a tell tale device 19. One of these latter pipes, for example pipe 28b is in communication with the passages leading to the interior of the containers 2, while the other of these pipes, in this case the pipe 28a is in communication with the passages leading to the interiors of the containers 5. With this arrangement, pipes 40a and 41a from the source of pressure supply 44 are in communication with pipes 28b and 28a respectively, and are provided with valves 42a and 43a in order that this communication with the source 44 may be selective. The result of the test with respect to the interior of the container 2 is indicated at one of the tell tale devices 19, while the result of the test with respect to the interior of the container 5 is indicated at the other tell tale device 19. Obviously the presence of fuel between containers 1 and 2 indicates a leak in container 1, and the presence of fuel between containers 2 and 5 indicates a leak also in the container 2.

Where a plurality of tanks are connected by pipes 28 as shown in Figure 12, the several tanks may be tested simultaneously, if desired, by opening all of the valves 47. This is true whether two tell tale devices are employed as shown in Figure 12, or whether only one is employed as shown in Figures 1 and 8. The operation in testing any of the tanks shown consists merely of forcing fluid from the source 44 to one side of the container 2 with the outlet from such side cut off, and opening the space at the other side of the container 2 to the tell tale device. The pressure at one side of the container 2 forces out any fuel present at the other side of container.

The fuel line 16 from each fuel tank may be provided with any well known suitable valve, and a valved pipe, such as 17a shown in Figure 8, may be provided between the fuel line and tell tale device, in order to determine the presence or absence of a valve leak in any fuel tank being held in reserve. Each of the tanks may be provided with a filler cap as shown at 38. Also, preferably, a quick dump valve as shown at 22 will be provided in order that the tank may be quickly emptied if desired.

I have shown an apparatus embodying my invention in several general forms but do not wish to be understood as limiting myself strictly to the precise details of construction hereinbefore described. I do not wish to be held to exact shapes or dimensions or to any particular combinations of parts but wish to be free to use any part herein shown or described or covered by the claims with any other part or parts whether shown herein or elsewhere.

Having thus described my invention, which I claim as new, and desire to secure by Letters Patent is:—

1. A safety fuel tank comprising a pair of spaced, concentrically arranged rigid containers, an elastic container interposed between said pair of containers in concentric relation thereto, said elastic container loosely enclosing the innermost of said pair of containers, and being loosely enclosed by the outermost of said pair of containers, tell tale means, a pipe extending from the tank to the tell tale means and having therein a pair of passageways, one of said passageways opening into the tank at the outer face of said elastic container, the other of said passageways opening into the tank at the inner face of said elastic container, valve means for opening and closing said passageways, a source of fluid pressure supply, and a valved pipe connecting each of said passageways with said source of fluid pressure supply.

2. A safety fuel tank comprising a pair of rigid containers, one enclosed within the other in spaced relation thereto, a flexible, impervious container loosely enclosing the innermost of said rigid containers, and being loosely enclosed by the outermost of said rigid containers, tell tale means, means to provide a pair of valved passageways between the tank and the tell tale means, one of said passageways opening into the tank at the outer face of said flexible container, the other of said passageways opening into the tank at the inner face of said flexible container, a source of fluid pressure supply, and means to provide valved conduits between said passageways and said source of fluid pressure supply.

3. A safety fuel tank comprising a pair of rigid containers, one enclosed within the other in spaced relation thereto, a flexible, impervious container loosely enclosing the innermost of said rigid containers, and being loosely enclosed by the outermost of said rigid containers, a tell tale device, a pipe extending from the tank to the tell tale device, said pipe opening into the tank at the outer face of said flexible container, a tube loosely enclosed within said pipe to divide the interior thereof into a pair of concentric passageways, said tube having one end opening into said tell tale device, and having its other end opening into the tank at the inner face of said flexible container, valve means for opening and closing said passageways, a source of fluid pressure supply, and a valved pipe connecting each of said passageways with said source of fluid pressure supply.

4. A safety fuel tank comprising a pair of rigid containers, one enclosed within the other in spaced relation thereto, a flexible, impervious container loosely enclosing the innermost of said rigid containers, and being loosely enclosed by the outermost of said rigid containers, a pair of tell tale devices, means to provide a valved passageway between the tank and each of said tell tale devices, one of said passageways opening into the tank at the outer face of said flexible container, the other of said passageways opening into the tank at the inner face of said flexible container, a source of fluid pressure supply, and means to provide a valved conduit between each of said passageways and said source of fluid pressure supply.

5. A pair of safety fuel tanks, each comprising a pair of rigid containers, one enclosed within the other in spaced relation thereto, a flexible, impervious container loosely enclosing the innermost of said rigid containers, and being loosely enclosed by the outermost of said rigid containers, means to provide a pair of passageways between said tanks, one of said passageways opening into said tanks at the outer faces of said flexible containers, the other of said passageways opening into said tanks at the inner faces of said flexible containers, a pair of tell tale devices, a pair of valved pipes connecting said tell tale devices with said passageways respectively, said passageways having valve means for opening and closing each of said tanks to both of said tell tale devices, a source of fluid pressure supply, and means to provide valved conduits between said tell tale devices and said source of fluid pressure supply.

6. A safety fuel tank comprising a pair of sectional, rigid containers, one enclosed within the other in spaced relation thereto, a sectional, flexible, impervious container loosely interposed between said rigid containers, tell tale means, means to provide a pair of valved passageways between the tank and the tell tale means, one of said passageways opening into the tank at the outer face of said flexible container, the other of said passageways opening into the tank at the inner face of said flexible container, a source of fluid pressure supply, and means to provide valved conduits between said passageways and said source of fluid pressure supply.

7. A safety fuel tank comprising a pair of rigid containers, one enclosed within the other in spaced relation thereto, fabric linings on the inner face of the outermost of said containers and on the outer face of the innermost of said containers, an elastic container loosely interposed between said fabrics in enclosing relation to the innermost of said rigid containers, tell tale means, a pipe extending from the tank to the tell tale means and having a pair of passageways, one of said passageways opening into the tank at the outer face of said elastic container, the other of said passageways opening into the tank at the inner face of said elastic container, valve means for opening and closing said passageways, a source of fluid pressure supply, and a valved pipe connecting each of said passageways with said source of fluid pressure supply.

HERBERT L. ADAMS.